US 6,606,324 B1

(12) United States Patent
Stracca

(10) Patent No.: US 6,606,324 B1
(45) Date of Patent: Aug. 12, 2003

(54) METHOD AND APPARATUS FOR THE CLOCK RECOVERY IN THE TRANSPORT OF CONSTANT BIT RATE SERVICES OVER ASYNCHRONOUS TRANSFER MODE

(75) Inventor: Daniele Stracca, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/495,302

(22) Filed: Feb. 1, 2000

Related U.S. Application Data

(63) Continuation of application No. PCT/IT97/00206, filed on Aug. 6, 1997.

(51) Int. Cl.[7] ............................................... H04L 7/00
(52) U.S. Cl. ................................. 370/395.62; 370/516
(58) Field of Search ........................ 370/395.62, 395.1, 370/516, 503

(56) References Cited

U.S. PATENT DOCUMENTS

| | | | | |
|---|---|---|---|---|
| 5,784,379 A | * | 7/1998 | Tan | 370/503 |
| 5,844,891 A | * | 12/1998 | Cox | 370/235 |
| 5,912,880 A | * | 6/1999 | Bernstein | 370/252 |
| 5,999,533 A | * | 12/1999 | Peres et al. | 370/395 |
| 6,111,878 A | * | 8/2000 | Powell | 370/395 |
| 6,252,850 B1 | * | 6/2001 | Lauret | 370/235 |
| 6,400,683 B1 | * | 6/2002 | Jay et al. | 370/229 |

FOREIGN PATENT DOCUMENTS

EP  0 394 051 A2  10/1990

OTHER PUBLICATIONS

Ahmed, "Adaptive Terminal Synchronization in Packet Data Networks", Communications Technology for the 1990's and Beyond, Dallas, Nov. 27–30, 1989, vol. vol. 2, No.—, Institute of Electrical and Electronics Engineers, pp. 728–732.

Ahmed et al, "ATM Circuit Emulation—A Comparison of Recent Techniques", Countdown to the New Millennium, Phoenix, Dec. 2–5, 1991, vol. vol. 1, No.—, Dec. 2, 1991, Institutes of Electrical and Electronics Engineers, pp. 370–374.

Lau et al, Synchronous Techniques for Timing Recovery in Bison, IEEE Transactions on Communications, vol. 43, No. 2/04, Part 03, Feb. 1, 1995, pp. 1810–1818.

Youn et al, CNV Based Intermedia Synchronization Mechanism Under High Speed Communication Environment, IEICE Transactions on Communications, vol. E76–B, No. 6, Jun. 1, 1993, pp. 634–645.

* cited by examiner

*Primary Examiner*—Ken Vanderpuye
(74) *Attorney, Agent, or Firm*—Nixon & Vanderhye, P.C.

(57) ABSTRACT

A method for the clock recovery in transport in constant bit rate channels(CBR), especially suitable for implementation of the adaptation layer of the asynchronous transfer mode (AAL) which comprises: the use of means for temporarily storing data at receiving end; the use of a clock frequency, with which data are polled out from said storing means, and calculation of a series of time differences(Zk), characterized in that said difference series is sent to a control block where the instant value(Zk) of said differences is multiplied by the value of its own index(k); it is subsequently compared to the sum of the previous values(Zk) considered up to the moment (k–th value); and it is checked that the absolute value of the differences outcoming from said comparison is less of the error(err) multiplied by the index(k–1) of the previous value(Zk) and by the absolute sum value(sum). The invention refers also to an apparatus to carry out such a method.

8 Claims, 7 Drawing Sheets

METHOD AND APPARATUS FOR THE CLOCK RECOVERY IN THE TRANSPORT OF CONSTANT BIT RATE SERVICES OVER ASYNCHRONOUS TRANSFER MODE

This is a continuation of PCT application No. PCT/IT97/00206, filed Aug. 6, 1997, the entire content of which is hereby incorporated by reference in this application.

BACKGROUND OF THE INVENTION

This invention refers to the clock recovery in transport of constant bit rate (CBR) channels, especially suited for the implementation of the adaptation layer of the asynchronous transfer mode (AAL). This adaptation layer is used for transport of CBR services over an ATM network.

More precisely, this invention relates to a method and an apparatus for clock recovery of a CBR service which is transported over a packet-switched network.

Four solutions of the problem of an adaptive clock recovery in transport of CBR services over an ATM are presently known. These methods are classified as "adaptive", since they do not need a common source of network timing as a reference to recover the remote source clock.

To recover a clock signal by periodically sampling a buffer fill level and adjusting the clock frequency to achieve a steady-state average of the buffer fill level or its derivative is known from WO 95/33 320.

WO 95/22 233 discloses the method of submitting to the first packet from a sequence of packets a predetermined delay, then the fill level of a delay buffer is monitored and subsequent packets are submitted to a variable delay, in order to keep the ill level of said buffer and to minimise the risk of over- or underflow of said buffer.

Furthermore, a time-averaging method and a method of optimal control are reported in IEEE 1988 ref. CH2535-3/86/0000-1468.

The International application PCT/SE 97/01168 in the name of the same Applicant as this application, discloses the recovery of clock frequency of a CBR service carried over a packet-switched network, comprising means for temporarily storing data at receiving end and providing a clock frequency, with which data is polled out from said storage means, and the calculation of a series of time differences.

The latter method is not affected by a few drawbacks of the others and allows a faster and more stable convergence than with said other methods, but it requires calculation means possessing high performances and ensures only a poor recovery of the source clock upon a drift.

SUMMARY OF THE INVENTION

This invention overcomes these drawbacks and makes the convergence still faster by an improved method for the clock recovery in transport of constant bit rate (CBR) channels. Such a method, comprising the steps of: temporarily storing data at receiving end; using a clock frequency, with which data is polled out from said storing means; and calculating a series of time differences, is characterised in that it comprises the further steps: of sending said difference series to a control block where the instant value of said differences is multiplied by the value of its own index; of subsequently comparing the obtained result to the sum of the previous values up to the moment; of checking that the absolute value of the difference outcoming from said comparison is less than the error multiplied by the index of the previous value and by the absolute sum value; and of calculating the control value of the clock correction by dividing the sum value by index and by multiplying the same by gain.

Preferably, the method comprises the further step of recalculating, after application of each correction, the cumulated sum, depending on system requirements, without resetting the index.

The invention relates also to an apparatus for the clock recovery in transport of constant bit rate (CBR) channels, suitable for the implementation of the adaptation layer of the asynchronous transfer mode (AAL, ATM Adaptation Layer), comprising memory means, apt to temporarily store data at the receiving end, a clock set to determine the frequency of data polled out from said memory means, calculation means, to calculate time differences between two consecutive incoming packets, means to reduce noise and means to adjust the frequency at which said clock operates. Such an apparatus is characterised in that it includes a control block which is adapted to carry out the multiplication of the instant value of said differences by its own index; a subsequent comparison with the sum of the value up to the moment; and a check that the absolute value of the difference, resulting from said comparison, is less than the error, multiplied by the index of the previous value and by the absolute value of the sum.

Such apparatus preferably comprises also fast filters and, respectively, slower, more precise filters to be independently utilized and calculation means adapted to calculate the control value of the clock correction, by dividing the sum value by the index and by multiplying the same by the gain.

The same apparatus can also comprise means adapted to recalculate the cumulated sum depending on the requirements of the system, without resetting the index and means adapted to increase error value when a number of corrections which took place previously were reciprocally concordant, and to lower the same when a number of corrections which took place previously were reciprocally discordant.

BRIEF DESCRIPTION OF DRAWINGS

The invention is now described more in depth below, referring to the annexed drawings, wherein.

DESCRIPTION OF THE PREFERRED EMBODIMENT

Figure 1:
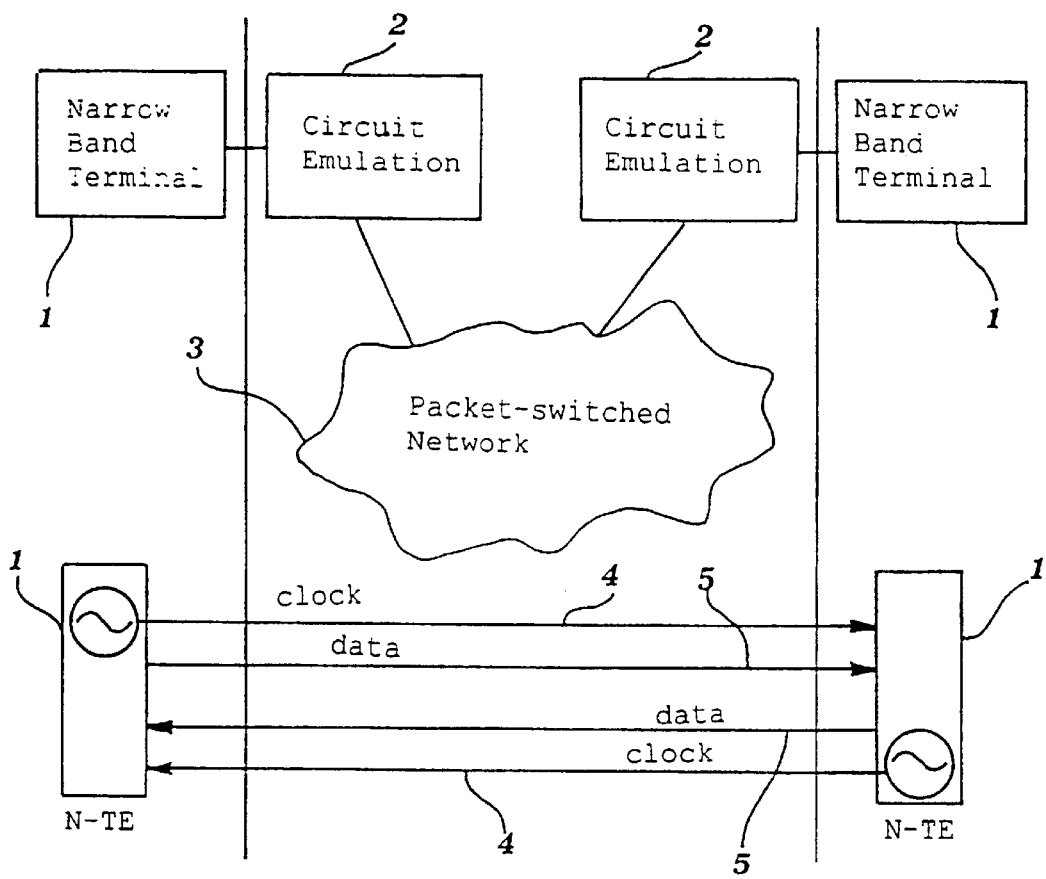
FIG. 1 shows how to send a CBR service in a packet-switched network.

Referring now to the annexed drawings, let us first consider FIG. 1: two Narrow Band Terminals 1 are sources of CBR services. They should establish a virtual circuit to communicate the one with the other over the packet switched network 3. In the described embodiment, the packet switched network 3 is (as in most of cases) an ATM network (Asynchronous Transfer Mode), but it could also be a different network.

Since transmission and switching in the ATM network introduce a variable transfer delay, it is more suitable for transmission of bursty data than of data from a CBR service 5. For this reason, an adaptation for transport of CBR traffic 5 is performed by a CE functionality 2 of circuit emulation. The CE 2 performs necessary adaptations to emulate all the services of a 64 kbit/s (or other bit rate) circuit virtually connected to the remote narrow band terminal 1. If the ATM network 3 is seen as the future broadband network (B-ISDN, Broadband-Integrated Services Digital Network) and the narrow band terminals 1 operate in the existing narrowband network (N-ISDN, Narrowband-Integrated Services Digital Network) the CE 2 can be seen as providing the integration, being a unit which cooperates with both networks. The CE 2 interfaces, on the broadband side, the ATM cells and, on the narrowband side, the synchronous bitstream from the CBR signal 5. The CBR signal 5 is segmented by the CE 2 into 376 bit units, namely into 47 octets and then mapped into the payload field of an ATM cell. The cell is then routed through the ATM network 3.

Figure 2:
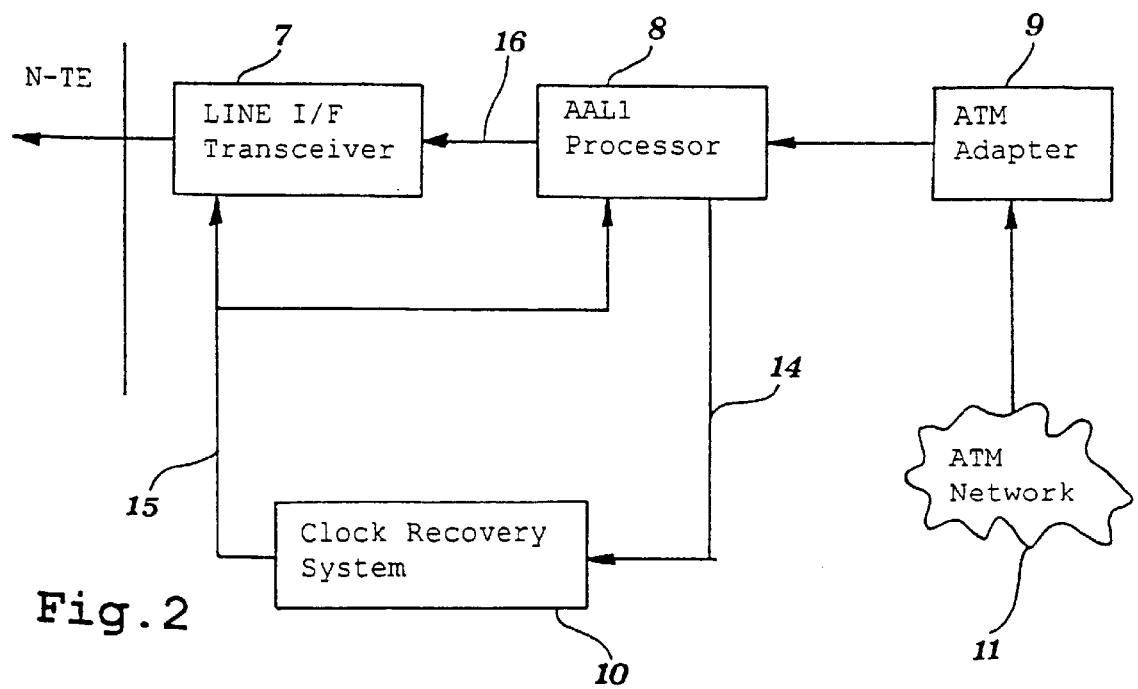
FIG. 2 is a block diagram of the principles of receiving CBR data.

Reference is now made to the block diagram in FIG. 2. It represents the detail of the receiving side of CE 2 and makes reference to an application for 64 kbits/s lines.

ATM cells are received by the ATM network 11 through the ATM adapter 9 and processed in the AAL1 layer (ATM Adaptation Layer 1) 8. The AAL1 block 8 terminates the AAL1 protocol and extracts from each cell 47 octets which correspond to 376 bits of the CBR service traffic. Every time a valid ATM cell is received in the AAL1 block 8, a signal 14 is sent to the system 10 of clock recovery. The output of the system 10 of clock recovery is the clock 15 used to re-generate the CBR service traffic from the cells to the 64 kbits/s line 16. This 64 kbits/s stream is passed to the narrowband terminal through a transceiver block 7.

Figure 3:
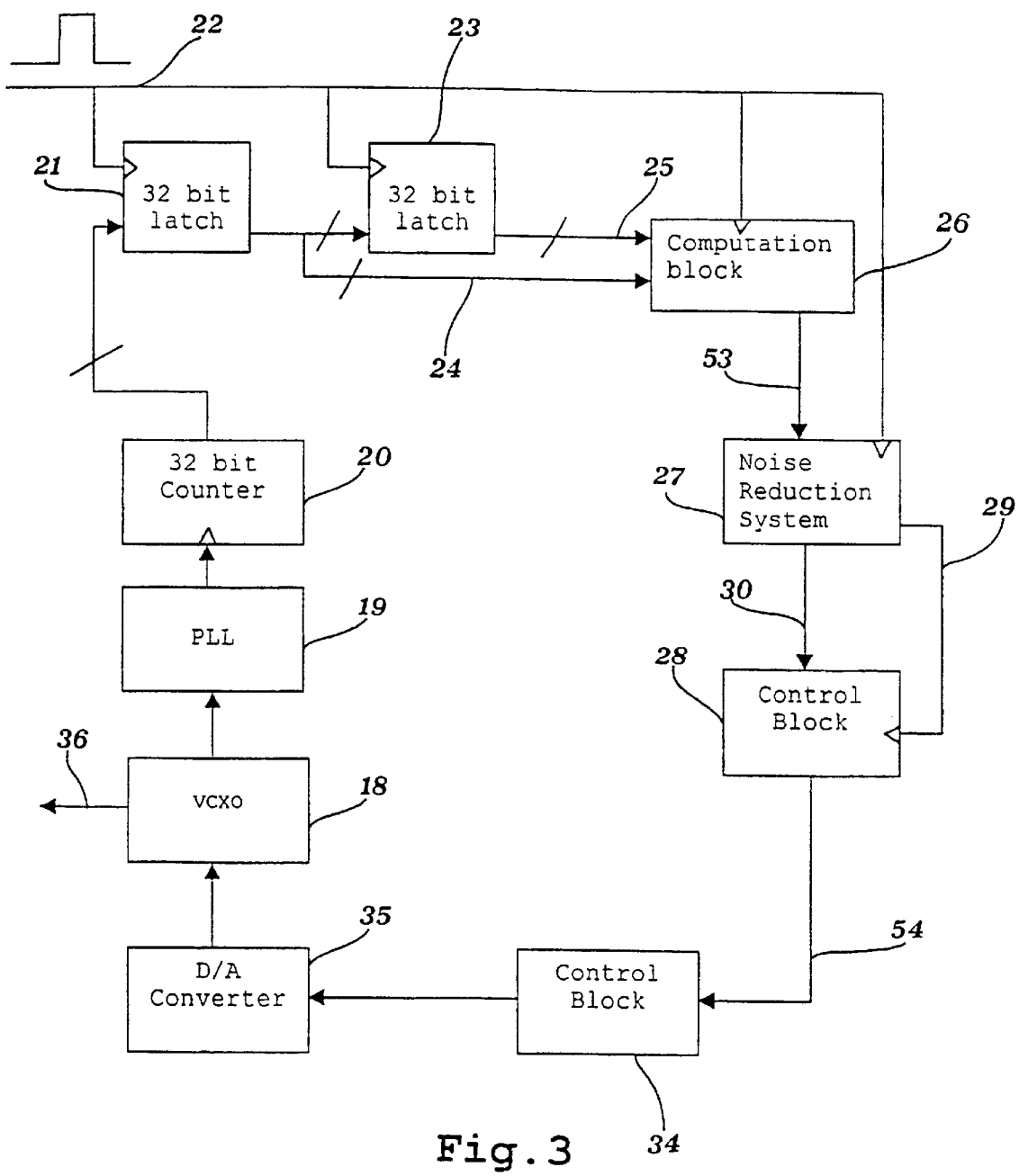
FIG. 3 is a block diagram showing a system of clock recovery according to the invention.

FIG. 3 is a detailed block diagram of the system 10 of clock recovery according to the invention.

When a valid ATM cell is received in the AAL1 block 8, a signal is raised which arrives on line 22 and is applied to a first 32-bit latch 21, a second 32-bit latch 23, a computation block 26 and a system of noise reduction 27.

The clock source in this embodiment is a VCXO quartz oscillator 18, which is voltage controlled. Such a device has a maximum deviation in frequency of ±50 parts per million (ppm) and it has a high degree of stability in frequency, in respect to the applied voltage and temperature. This is the reason why its output frequency can be assumed to be constant for a given input control voltage and for an observation time of $\leq 60s$. The generated frequency $f_s$ 36 is applied to a PLL 19 used to multiply VCXO frequency $f_s$ by a constant M. This multiplication is required to measure the cell inter-arrival time with enough accuracy. Such a target is accomplished by applying the $M \times f_s$ clock to a free running 32-bit counter 20. The output of this counter 20 is latched by the first 32-bit latch 21 when a cell is received. This output is subtracted from the previous one (which is stored in the second 32-bit latch 23) and provides the number of clock periods between the arrival of two consecutive cells.

Let us now call the unknown transmitter clock $f_t$. Each cell is transmitted when 47 octets, corresponding to 376 bits of CBR traffic have been stored in the cell. Therefore the period $T_c$ of cell generation is:

$$T_c = 376/f_t$$

Furthermore, let us suppose that ATM network introduces a constant delay in transport of each cell. With this assumption, the cell inter-arrival time is constant and equal to $T_c$. In this case, it is possible to simply evaluate the number of counted periods $w_n$ which is directly corresponding to $T_c$:

$$w_n = |x_n - x_{n-1}| = |M \times f_s \times T_c| = |M \times f_s \times 376/f_t| = |M \times 376 \times f_s/f_t|$$

The fractional residual part of the result is cumulated by the counter 20 and counted as a unit when a sufficient number of cells has been received. In this way, the precision of the timing measurement is maintained and very low clock differences can be measured. The only drawback is that the lower the clock difference $(f_s - f_t)$, the higher the number of cells to be observed before a difference in the expected $w_n$ is found. If the frequencies are equal, the expected value for $w_n$ is:

$$E\{w_n\} = M \times 376$$

To obtain a value that equals zero $(y_n)$ when $f_s$ and $f_t$ are the same, the following calculation is performed by the computation block 26 when a cell is received:

$$y_n = w_n - E\{w_n\} = (x_{n-1}) - (M \times 376)$$

This result is applied to a system of noise reduction 27. Said system is used to integrate the results from previous blocks and to reduce the effect of jitter on the delay of cells (CDV) of the system. The system of noise reduction 27 accepts a new sample and generates a new output when a cell arrives. Its output $z_n$ 30 is applied to a control block 28.

Figure 4:
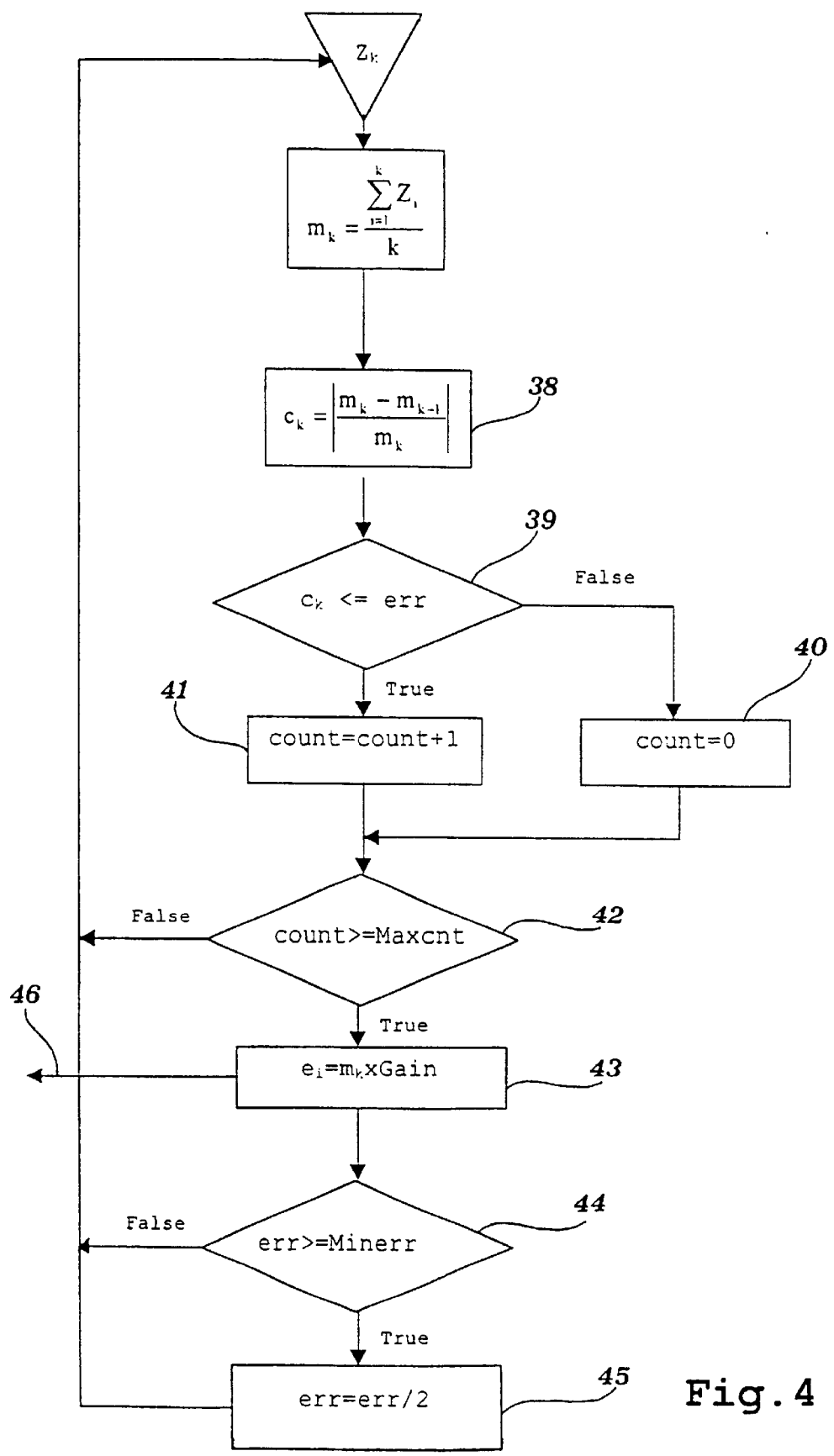
FIG. 4 is a flow sheet of the blocks of average calculations and of control of average slope, according to the prior art of PCT/SE97/01168.

Since the method according to the present invention is an improvement of the one according to PCT/SE97/01168, reference is suitably made to the flow chart according to the said PCT/SE97/01168t as shown in FIG. 4.

According to this technique, all the received $z_n$ 30 are averaged in a block for average estimate, producing a sequence of values $m_k$ as an output. This is achieved by dividing the accumulated sum by index k.

Upon each correction, this block is reset and the estimator re-started. However, in this way only the cells after the latest correction are considered in averaging. A new $m_k$ is generated by the block for average estimate every time a new cell is received. The $m_k$ sequence is applied to a mean slope control block. This block is responsible for the decision on the number of $z_n$ samples that the block for average estimate must cumulate to obtain a good estimate of the average interarrival time of cells. The block erforms also the evaluation of the correction value to be applied to the VCXO 18, which is maintained stable until a new $e_i$ value is evaluated. This block evaluates the slope of $m_k$ sequence by computing its percent change $c_k$. The new correction value $e_i$ for VCXO 18 is calculated if $c_k$ is less than error value err for max__count times. This means that (with a high probability) $m_k$ sequence does not increase or decrease (by percent) to a great extent. This is according to the property of asymptotic convergence of the average estimator, which is reflected by the slope of $m_k$ sequence that asymptotically tends to zero.

Every time a correction $e_i$ is evaluated, a new error value err is computed. This parameter is decreased as the system approaches convergence, so as to have a quick start-up at the beginning and more stability subsequently. A simple way to achieve this is by reducing each time error err by a constant factor (2), up to a min_err value.

A new $e_i$ value is applied to the correction block which is connected to a D/A converter. Such a block has the task of cumulating $e_i$ values. The result is applied to the D/A converter that generates a control voltage for the VCXO.

The VCXO is supposed to operate at its minimum frequency when applied control voltage reaches the upper limit.

Figure 5:
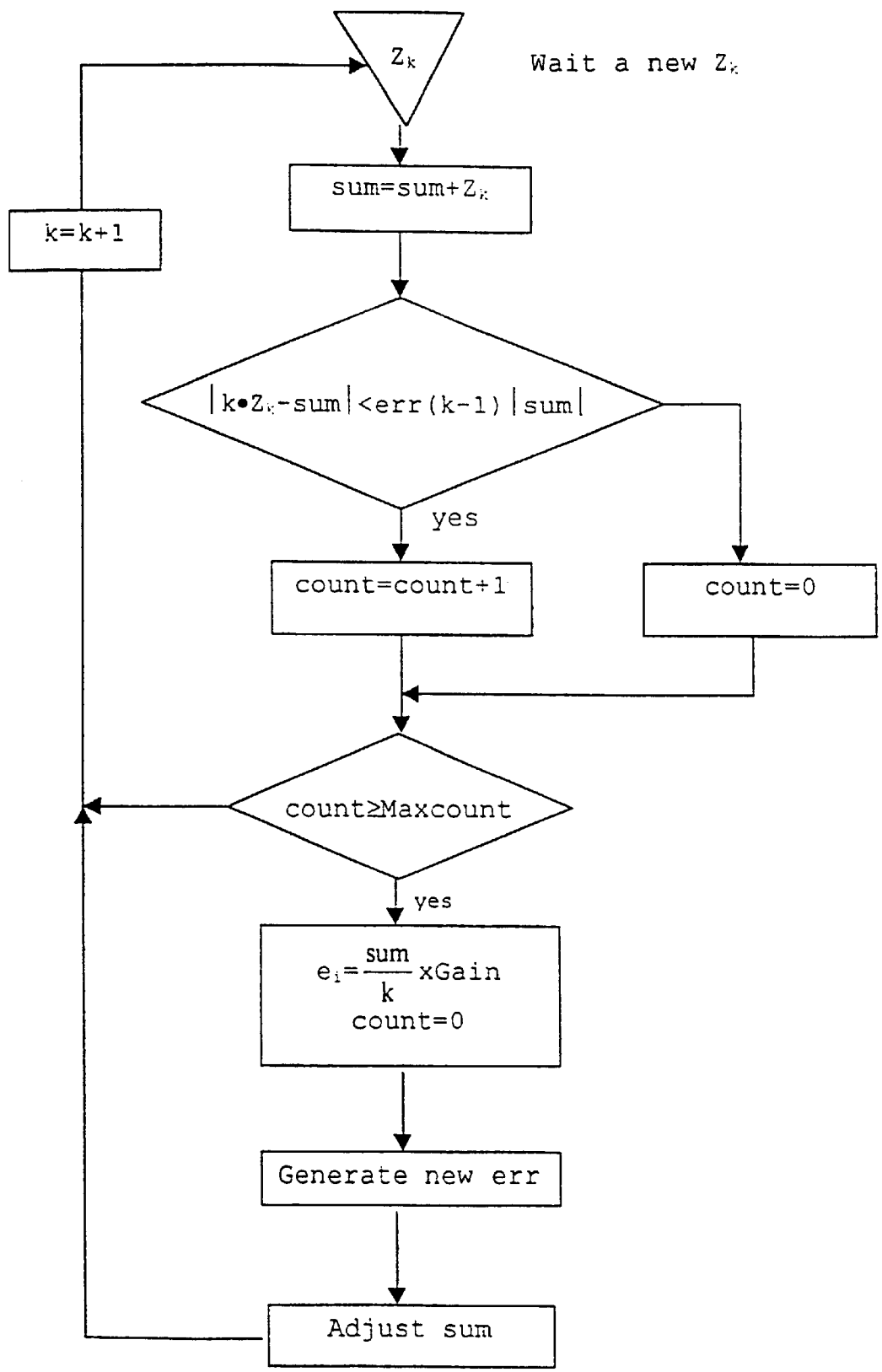
FIG. 5 is a flow sheet of the control block according to the invention.

It is apparent from above that the major computational task in the method according to PCT/SE97/01168 is that of the average estimator that should continuously perform divisions. This is avoided by the method of the present invention, which is now set forth making reference to the flow sheet of the control block 28, which is reported in FIG. 5.

It can be started by bearing in mind that the inequality:

$$\left|\frac{m_k - m_{k-1}}{m_k}\right| < err$$

on which the method of PCT/SE97/01168 is based may be written as:

$$|m_k - m_{k-1}| < err\, |m_k|$$

This formula may be accordingly developed:

$$\left|\frac{\sum_{i=1}^{k} z_i}{k} - \frac{\sum_{i=1}^{k-1} z_i}{k-1}\right| < err\left|\frac{\sum_{i=1}^{k} z_i}{k}\right|$$

$$\left|(k-1)\sum_{i=1}^{k} z_i - k\sum_{i=1}^{k-1} z_i\right| < err(k-1)\left|\sum_{i=1}^{k} z_i\right| \quad (k \neq 0, 1)$$

$$\left|(k-1)\sum_{i=1}^{k} z_i - k\sum_{i=1}^{k} z_i - z_k\right| < err(k-1)\left|\sum_{i=1}^{k} z_i\right|$$

therefore:

$$\left|k\, z_k - \sum_{i=1}^{k} z_i\right| < err(k-1)\left|\sum_{i=1}^{k} z_i\right|$$

When working with this new formula instead of the starting one, a division per cell arrival is no longer required. A division should be performed only when a correction is actually applied, so allowing an advantageous slowing down of the clock performing the algorithm. If a TI TMS320C50 processor is employed, such a reduction is by a factor 13.

In the method of PCT/SE97/01168, the average estimator should be reset at each correction, so the previous samples are definitively discarded for subsequent means.

In the method according to the present invention, after a correction is applied, the clock of the 32 bit counter 20 changes and accordingly the way the new $y_k$ are computed changes. Thus, the need to adjust the past sum to the new time scale arises.

If the amplitude of the clock change (gain) is chosen in order to bring to zero the expected error, $E\{y_k\}$, also the old sum, scaled with the new clock, must be zero; otherwise, it must be scaled to the correct value. The overall gain (which includes the factor by which $m_k$ is multiplied and the gain of the VCXO 18) must be chosen in order to reduce the error to a determined percentage, which can be computed as follows:

New_Error=α*Old_Error (α can be, for instance, 0.1 or even 0)

where (calling $\tau_k$ the interarrival time):

Old_Error=$E\{y_k\}$=$E\{\tau_k * f_s * M - 376M\}$

New_Error=$E\{\tau_k * (f_s - \Delta f) * M - 376M\}$

Total_Gain=$\Delta f/E\{m_k\}$=$\Delta f$/Old_Error=$(1-\alpha)/(E\{\tau_k\}*M)$==$(1-\alpha)*f_{nominal}/(376*M)$ So the action to be performed after each correction is just adjusting the cumulated sum, while keeping the running value of k:

Adjusted_Sum=$k$*New_Error

A choice of zero for α guaranties the quickest convergence for clock recovery, while other values can be chosen to have a smoother approach.

Sometimes, anyway, the estimator can be reset to guarantee the computing precision, as no more than 10,000 samples are needed to achieve the best precision.

Since it is desired to keep parameter err more tied to the actual convergence of the system, it is necessary to use a procedure different from PCT/SE97/01168.

Therefore, parameter err can receive three different modifications. If the latest correction is not in the same direction as the previous one (i.e. the estimated value oscillates around the true one), parameter err is lowered by the factor fatt_err_down. Otherwise, the number of consecutive, mono-directional corrections is evaluated (count_flag) and err is increased by a factor fatt_err_up or decreased by a factor fatt_err (fatt_err<fatt_err_down), depending on whether this number (count_flag) has exceeded a value max_count_err or not. The situation wherein err is increased is when the number (or amplitude) of corrections seems clearly not adequate.

Figure 6:
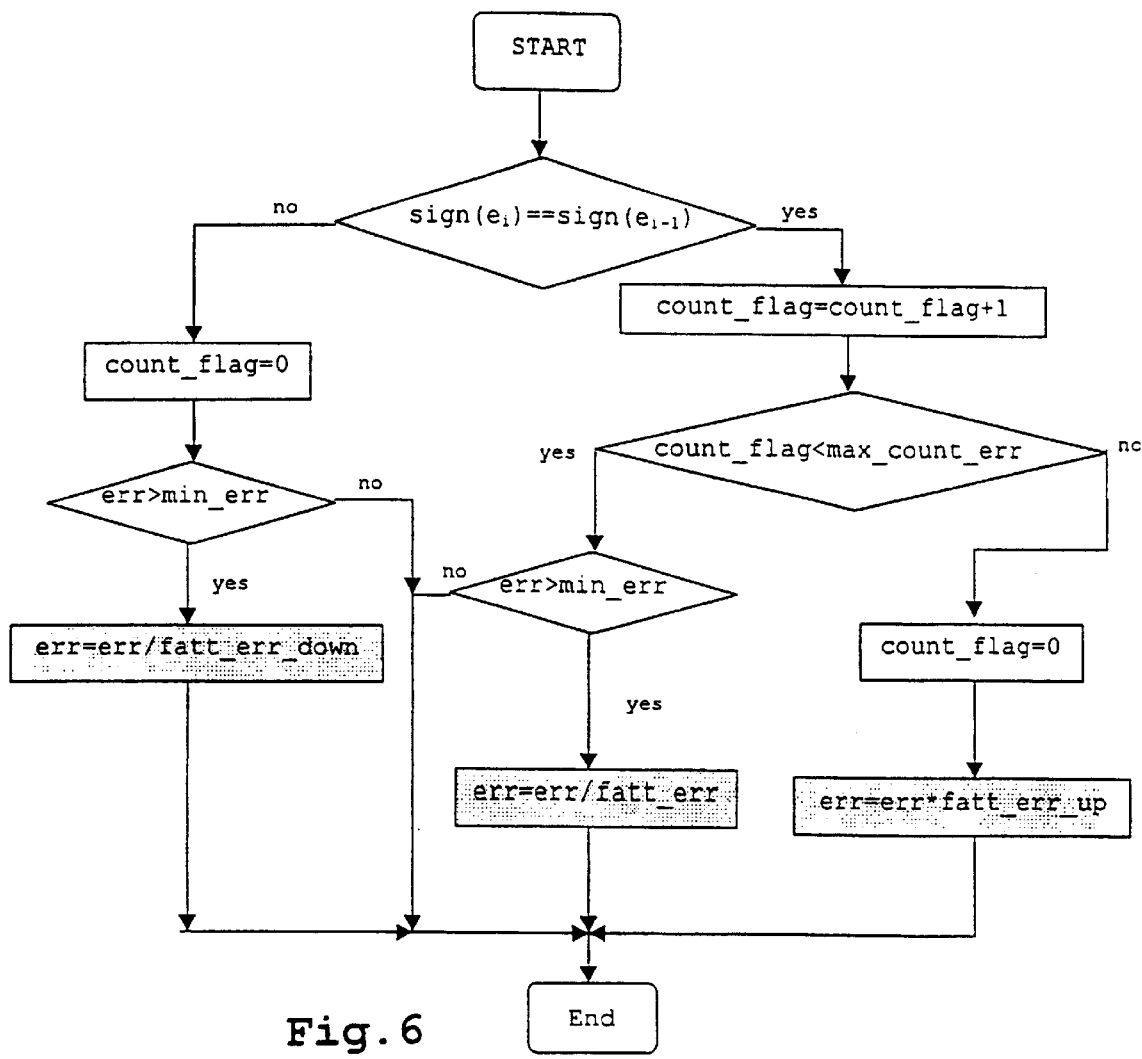
FIG. 6 is a flow sheet relative to a system of error calculation according to the invention.

The flow sheet is reported in FIG. 6.

Such a management proves to be useful when transmitting source is subject to a slow drift, since it allows a better track of these low frequency changes.

Exemplary 64 kbits/s Simulation

A more complex treatment of the err parameter is adopted in this simulation, according to this invention. Furthermore, $m_k$ value is not reset, but only adjusted on each correction.

Figure 7:
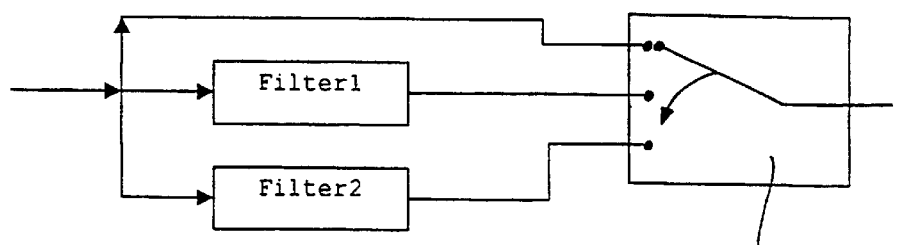
FIG. 7 is the scheme of a preferred embodiment of a system of noise reduction with which the invention performances are improved.

A system 27 of noise reduction (FIG. 3) is employed, which is able to use different filters at different times. Filters employed in first steps are fast filters, having short convergence times, although they are poor in precision. On the contrary, filters employed in subsequent steps are slower, but more precise filters so, each kind of filter is used only when it has (almost) reached its stability. The actual implementation of the system 27 of noise reduction is shown in FIG. 7.

At the beginning, samples are transmitted as they are, being in no way filtered. The input-output relation of filters is:

$$a(0)y(n) = b(0)x(n) + b(1)x(n-1) + b(2)x(n-2) + b(3)x(n-3) +$$
$$-a(1)y(n-1) - a(2)y(n-2) - a(3)y(n-3)$$

The first filter, Filter 1, is an integrator with coefficients:

| i | b(i) | a(i) |
|---|------|------|
| 0 | 0.4  | 1.0  |
| 1 |      | −0.2 |
| 2 |      | −0.2 |
| 3 |      | −0.2 |

The second filter, Filter 2, is tighter and has coefficients:

| i | b(i) | a(i) |
|---|------|------|
| 0 | 7.705240900000e − 03 | 1.0 |
| 1 | 1.541048200000e − 02 | −1.736790300000e + 00 |
| 2 | 1.541048200000e − 02 | 7.676112800000e − 01 |

The selector 33 switches to Filter 1 after twenty samples and then, after hundred more, to Filter 2.

The following parameters were chosen:

| Parameter | Value |
|-----------|-------|
| M | 8 |
| max_count | 2 |
| err_iniziale | 5e − 3 |
| fatt_err_up | 1.5 |
| err_minimo | 5e − 6 |
| gain | 1.055*64000/(376*8) |
| max_count_err | 2 |
| fatt-err | 1.8 |
| fatt_err_down | 2.3 |
| max_err | 1e − 3 |

Figure 8:
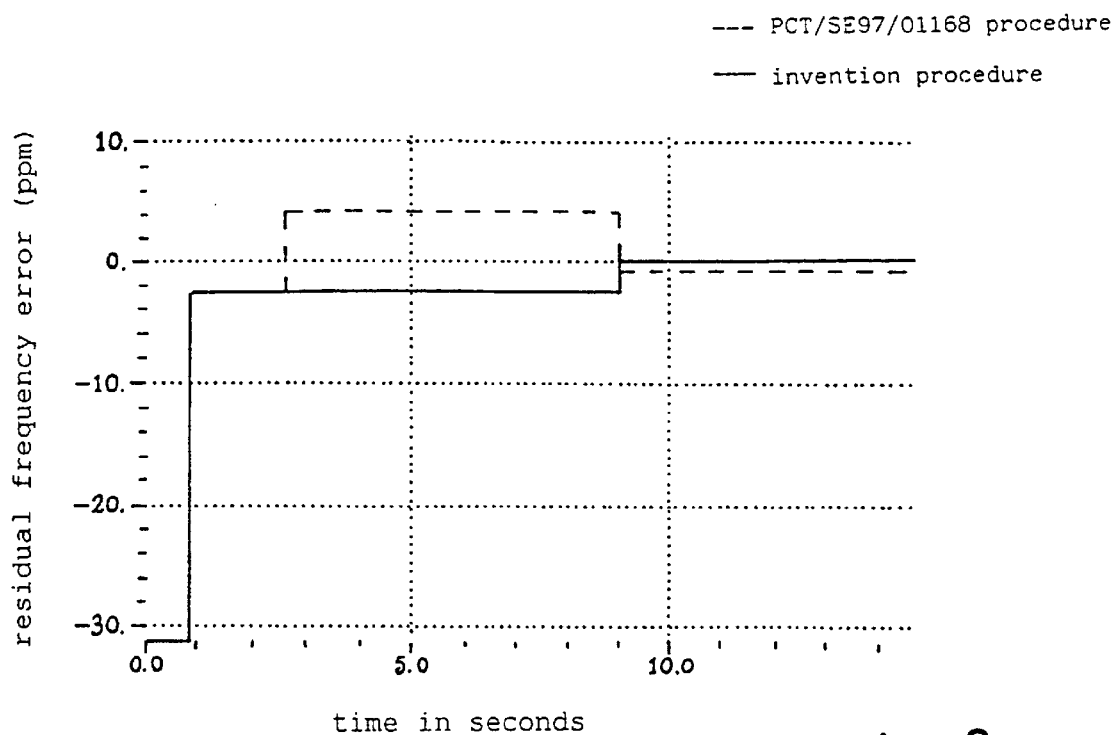
FIG. 8 is a diagram which compares the clock recovery according to the previous PCT/SE97/01168 and to the present invention, relative to the residual frequency error.

The results are now reported. Let us consider the diagram reported in FIG. 8, representing residual frequency error in ppm vs. time, as the system is loaded with the output of an ATM switch, loaded at 90% of its capacity. The diagram compares the clock recovery according to the previous PCT/SE97/01168 (dashed line) and to this invention (solid line).

Figure 9:
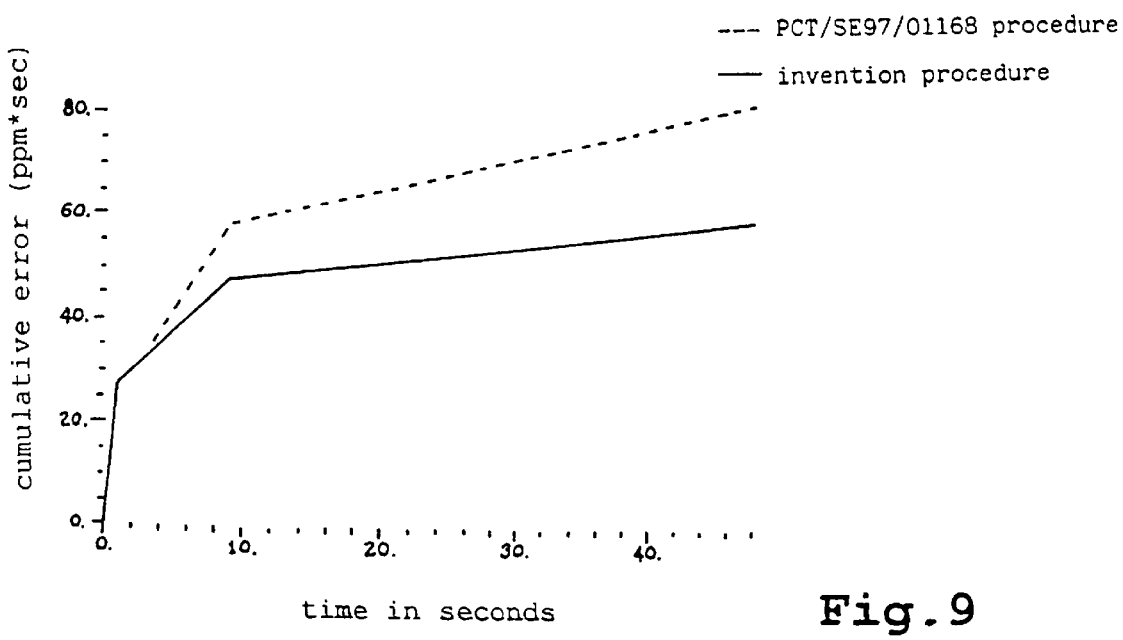
FIG. 9 is a diagram comparing performances achievable according to PCT/SE97/01168 and to the present invention, relative to the cumulated error.

As it can be seen from FIG. 8, the convergence time (to a few ppm of error) is about 1 second when employing the method according to the present invention. The apparent improvements over PCT/SE97/01168 are better pointed out in the diagram of cumulated error reported in FIG. 9.

Figure 10:
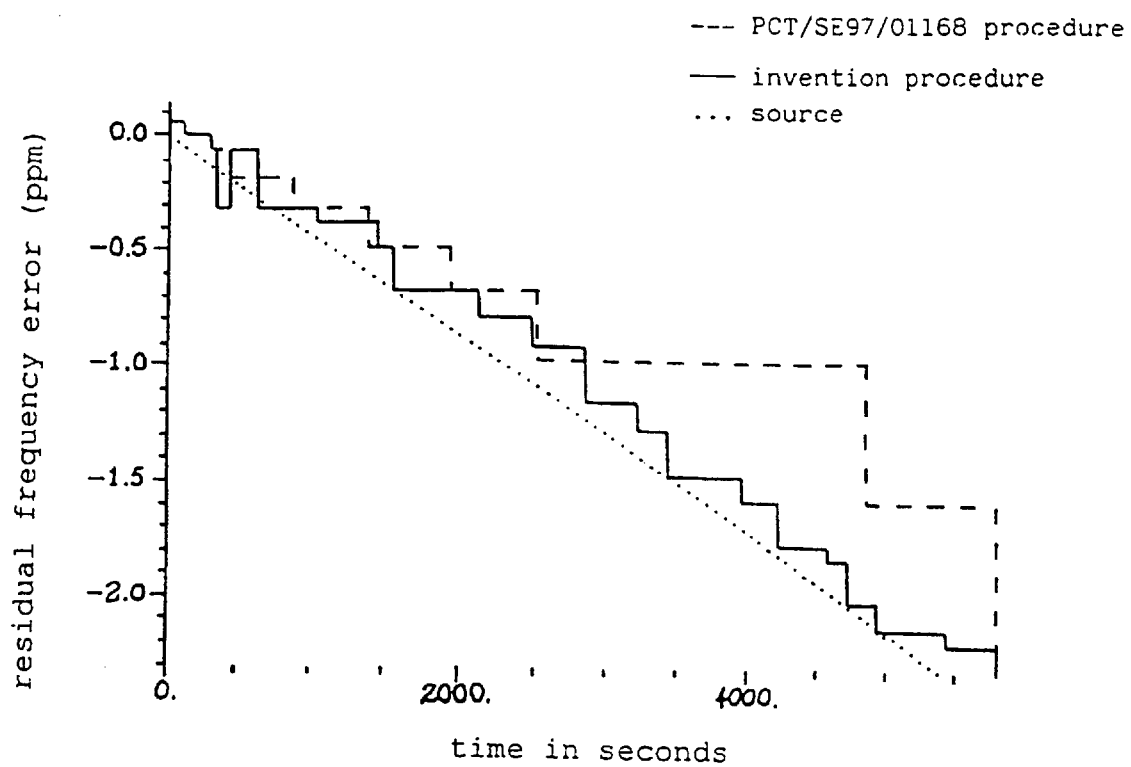
FIG. 10 is a diagram comparing performance achievable according to PCT/SE97/01168 and to the present invention when the source clock drifts.

The diagram reported in FIG. 10 shows in turn the long term behaviour of clock recovery upon a drift of the transmitting source (when the transmitting source slowly changes its clock: 3 ppm during 7,000 seconds). The dotted line is the clock source, while the dashed line is the response according to PCT/SE97/01168 method and the solid line is the response according to this invention. The apparent improvement obtained with the new treatment of parameter err according to the invention may easily be appreciated from the comparison of the two responses.

The advantages achieved with the method according to the present invention may be summarised in a faster and more precise convergence, a better track of the drift of transmitting source and a strong reduction of the complexity of the system and of operation thereof.

It should be understood that other embodiments and implementations of the invention, different from the ones described, are conceivable. Particularly, it is a matter of course that the method and apparatus according to this invention can be used with clock rates other than 64 kbits/s.

What is claimed is:

1. A method for the clock recovery in transport in constant bit rate (CBR) channels, for implementation of the adaptation layer of the asynchronous transfer made (AAL), comprising the steps of: temporarily storing data at receiving end; using a clock frequency, with which data are polled out from said storing means, and calculating a series of time differences ($z_k$), characterised in that it further comprises the steps: of sending said difference series to a control block where the instant value ($z_k$) of said differences is multiplied by the value of its own index (k); of subsequently comparing the obtained result to the sum (sum) of the previous values ($z_k$) considered up to the moment (up to k−th value); of checking that the absolute value of the difference outcoming from said comparison is less than the error (err) multiplied by the index (k−1) of the previous value ($z_k$) and by the absolute sum value (sum); and of calculating the control value ($e_i$) of the clock correction by dividing the sum value (sum) by index (k) and by multiplying the same by gain.

2. A method as claimed in claim 1, further comprising the step of calculating, after application of each correction, the cumulated sum, depending on the requirements of the system, without resetting the index (k).

3. A method as claimed in claim 1, further comprising the step of increasing the error value (err), if a number of corrections which took place previously were reciprocally concordant, or of lowering the same, if a number of corrections which took place previously were reciprocally discordant.

4. An apparatus for the clock recovery in transport in constant bit rate (CBR) channels, for the implementation of the adaption layer of the asynchronous transfer mode (ATM), comprising memory means, apt to temporarily store data at receiving end, a clock set (18, 19) to determine the frequency of data polled out from said memory means, calculation means (26) to calculate time differences between two consecutive incoming packets, means (27) to reduce noise and means (28, 34) to adjust the frequency at which said clock operates, characterised in that it includes a control block (28) which is adapted to carry out the multiplication of the present value ($z_k$) of said differences by the index (k) of the same present value ($z_k$), a subsequent comparison with the sum (sum) of the values ($z_k$) considered up to the moment (up to k−th value), and a check that the absolute value of the difference, resulting from said comparison, is less than the error (err), multiplied by the index (k−1) of the previous ($z_k$) value (k−1−th value) and by the absolute value of the sum (sum).

5. An apparatus as claimed in claim 4, further comprising fast filters (Filter 1) and, respectively, slower, more precise filters (Filter 2) to be independently utilized.

6. An apparatus as claimed in claim 4, further comprising calculation means (28, 34) adapted to calculate the control valve ($e_i$) of the clock correction, by dividing the sum value (sum) by the index (k) and by multiplying the same by the gain.

7. An apparatus as claimed in claim 4, further comprising means (28) adapted to recalculate the cumulated sum depending on the requirements of the system, without resetting the index (k).

8. An apparatus as claimed in claim 4, further comprising means (28) adapted to increase error value (err) when a number of corrections which took peace previously were reciprocally concordant, and to lower the same when a number of corrections which took place previously were reciprocally discordant.

* * * * *

UNITED STATES PATENT AND TRADEMARK OFFICE
CERTIFICATE OF CORRECTION

PATENT NO.      : 6,606,324 B1
DATED           : August 12, 2003
INVENTOR(S)     : Stracca It is certified that error appears in the above-identified patent and that said Letters Patent is hereby corrected as shown below:

Column 8,
Line 12, change "made" to -- mode --.

Column 9,
Line 3, change "peace" to -- place --.

Signed and Sealed this

Twenty-fifth Day of November, 2003

JAMES E. ROGAN
*Director of the United States Patent and Trademark Office*